United States Patent
Lee

(10) Patent No.: US 8,099,831 B2
(45) Date of Patent: Jan. 24, 2012

(54) HINGE STRUCTURE AND A MOBILE COMMUNICATION TERMINAL THEREWITH

(75) Inventor: Sang-Min Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 990 days.

(21) Appl. No.: 11/842,756

(22) Filed: Aug. 21, 2007

(65) Prior Publication Data

US 2008/0047103 A1 Feb. 28, 2008

(30) Foreign Application Priority Data

Aug. 22, 2006 (KR) ...................... 10-2006-0079244

(51) Int. Cl.
    *E05F 1/08* (2006.01)
(52) U.S. Cl. ..... 16/303; 16/326; 455/575.3; 379/433.13
(58) Field of Classification Search ............ 16/303–305, 16/321, 324, 326–330, 341, 297; 455/575.3; 379/433.13; 361/679.27
    See application file for complete search history.

(56) References Cited

U.S. PATENT DOCUMENTS

| 5,697,124 | A | * | 12/1997 | Jung | 16/341 |
| 5,987,122 | A | * | 11/1999 | Daffara et al. | 379/433.13 |
| 6,085,387 | A | * | 7/2000 | Han | 16/330 |
| 6,292,980 | B1 | | 9/2001 | Yi et al. | |
| 6,459,887 | B2 | * | 10/2002 | Okuda | 455/90.1 |
| 6,808,402 | B2 | * | 10/2004 | Ryu et al. | 439/165 |
| 6,886,221 | B2 | * | 5/2005 | Minami et al. | 16/324 |
| 6,952,860 | B2 | * | 10/2005 | Kawamoto | 16/285 |
| 6,963,766 | B2 | * | 11/2005 | Jung | 455/575.3 |
| 7,007,345 | B2 | * | 3/2006 | Nakase et al. | 16/330 |
| 7,111,362 | B2 | * | 9/2006 | Gordecki | 16/303 |
| 7,124,472 | B2 | * | 10/2006 | Duan et al. | 16/303 |
| 7,150,072 | B2 | * | 12/2006 | Huang et al. | 16/312 |
| 7,155,780 | B2 | * | 1/2007 | Chen | 16/326 |
| 7,168,133 | B2 | * | 1/2007 | Luo et al. | 16/303 |
| 7,383,616 | B2 | * | 6/2008 | Duan et al. | 16/303 |
| 7,433,467 | B2 | * | 10/2008 | Yi | 379/433.13 |
| 7,434,296 | B2 | * | 10/2008 | Kubota | 16/330 |
| 7,513,010 | B2 | * | 4/2009 | Duan et al. | 16/330 |
| 2005/0220294 | A1 | * | 10/2005 | Gupte | 379/433.13 |
| 2006/0174443 | A1 | * | 8/2006 | Takagi et al. | 16/330 |
| 2008/0155784 | A1 | * | 7/2008 | Hsu et al. | 16/303 |

FOREIGN PATENT DOCUMENTS

KR 1020060041088 5/2006

* cited by examiner

*Primary Examiner* — William L. Miller
(74) *Attorney, Agent, or Firm* — The Farrell Law Firm, P.C.

(57) ABSTRACT

A hinge structure for a mobile communication terminal includes a drive cam arranged to be linearly displaced along a hinge axis, a drive shaft arranged to face the drive cam to be rotated about the hinge axis according to linear displacement of the drive cam, a follower shaft arranged to surround the drive shaft to be rotated along with the drive shaft, a follower cam arranged to face the follower shaft to be linearly displaced along the hinge axis according to rotation of the follower shaft, and an opening/closing resilient member for pushing the follower cam against the follower shaft.

21 Claims, 4 Drawing Sheets

HINGE STRUCTURE AND A MOBILE COMMUNICATION TERMINAL THEREWITH

PRIORITY

This application claims priority under 35 U.S.C. §119 to an application filed in the Korean Intellectual Property Office on Aug. 22, 2006 and assigned Serial No. 2006-79244, the contents of which are incorporated herein by reference.

BACKGROUND OF THE INVENTION

1. Field of the Invention

The present invention relates to a mobile communication terminal, and more particularly to a hinge structure for connecting a pair of housings of a mobile communication terminal to be folded or opened.

2. Description of the Related Art

Mobile communication terminals are generally classified into bar, flip, and folder types according to their external forms. A bar type has a single body housing provided with the data input/output devices and the voice transmission and reception devices, and a flip type is made by adding a flip to the bar type. A bar type terminal has a keypad exposed to cause erroneous operation due to its being inadvertently pressed, while a flip type terminal has a keypad protected by the flip from inadvertent pressing. However, both bar and flip type terminals have a common limitation in miniaturization because distance between a transmission port and a reception port may not be reduced below a certain limit.

On the other hand, a folder type terminal includes a folder connected by a hinge to a main body so the folder may be turned to open or close the main body. The folder is folded onto the main body to prevent the keypad from inadvertent operation in the standby mode, while it is turned away from the main body in the communication mode to make the distance between the transmission and the reception port sufficient for adapting to the mouth and ear, thus facilitating miniaturization of the terminal. This feature has contributed to the popularity of the folder type terminal.

Meanwhile, the hinge structure for connecting the main body and the folder may be designed to provide a drive force to automatically or semi-automatically swing the folder. An example of a hinge structure to semi-automatically swing the folder is disclosed in U.S. Pat. No. 6,292,980, issued Sep. 25, 2001, and commonly assigned to the assignee of the present application. Such a hinge structure includes a pair of cams pushed toward each other by a resilient force, so ridges of one cam rotate and engage valleys of the other cam to produce a drive force for folding or opening the folder onto or off the main body according to the rotational angle of the folder. This semiautomatic hinge structure is simple in construction, but suffers a drawback that the user must directly turn the folder in order to open or close the terminal.

On the contrary, an automatic hinge structure employs a motor that is driven by a simple switching operation to open or close the folder. Although this provides a user with an easy means to handle the folder, the structure is complicated by the motor and the necessary conductor lines arranged to supply a power or a control signal to the motor, thus making it difficult to miniaturize the terminal, increasing the production cost and the power consumption of the terminal.

SUMMARY OF THE INVENTION

It is an aspect of the present invention to provide a hinge structure both contributing to miniaturization of a mobile communication terminal and facilitating the handling thereof.

It is an aspect of the present invention to provide a hinge structure to reduce production cost and power consumption of a mobile terminal.

According to an aspect of the present invention, a hinge structure for a mobile communication terminal includes a drive cam arranged to be linearly displaced along a hinge axis, a drive shaft arranged to face the drive cam to be rotated about the hinge axis according to the linear displacement of the drive cam, a follower shaft arranged to surround the drive shaft to be rotated along with the drive shaft, a follower cam arranged to face the follower shaft to be linearly displaced along the hinge axis according to rotation of the follower shaft, and an opening/closing resilient member for pushing the follower cam against the follower shaft.

According to another aspect of the present invention, a mobile communication terminal includes a first housing, a second housing, and a hinge structure for connecting the first and the second housing to fold or open the second housing onto or from the first housing by turning the second housing about a hinge axis, wherein the hinge structure includes a drive button mounted to be linearly displaced along the hinge axis and to protrude from a peripheral surface of the first housing, a drive cam arranged to be linearly displaced along the hinge axis according to linear displacement of the drive button, a drive shaft fixedly mounted in the second housing to face the drive cam to be rotated about the hinge axis according to the linear displacement of the drive cam, a follower shaft arranged to surround the drive shaft to be rotated along with the drive shaft, a follower cam arranged to face the follower shaft to be linearly displaced along the hinge axis according to rotation of the follower shaft, and an opening/closing resilient member for pushing the follower cam against the follower shaft, whereby pushing the drive button with the first housing folded onto the second housing linearly displaces the drive cam to make the drive shaft and follower shaft turn the second housing by an angle with reference to the first housing, at which angle the follower cam begins to move forward under the resilient force of the opening/closing resilient member to closely engage the follower shaft, thereby further turning the follower shaft and drive shaft to completely open the second housing.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENTS

Figure 1:
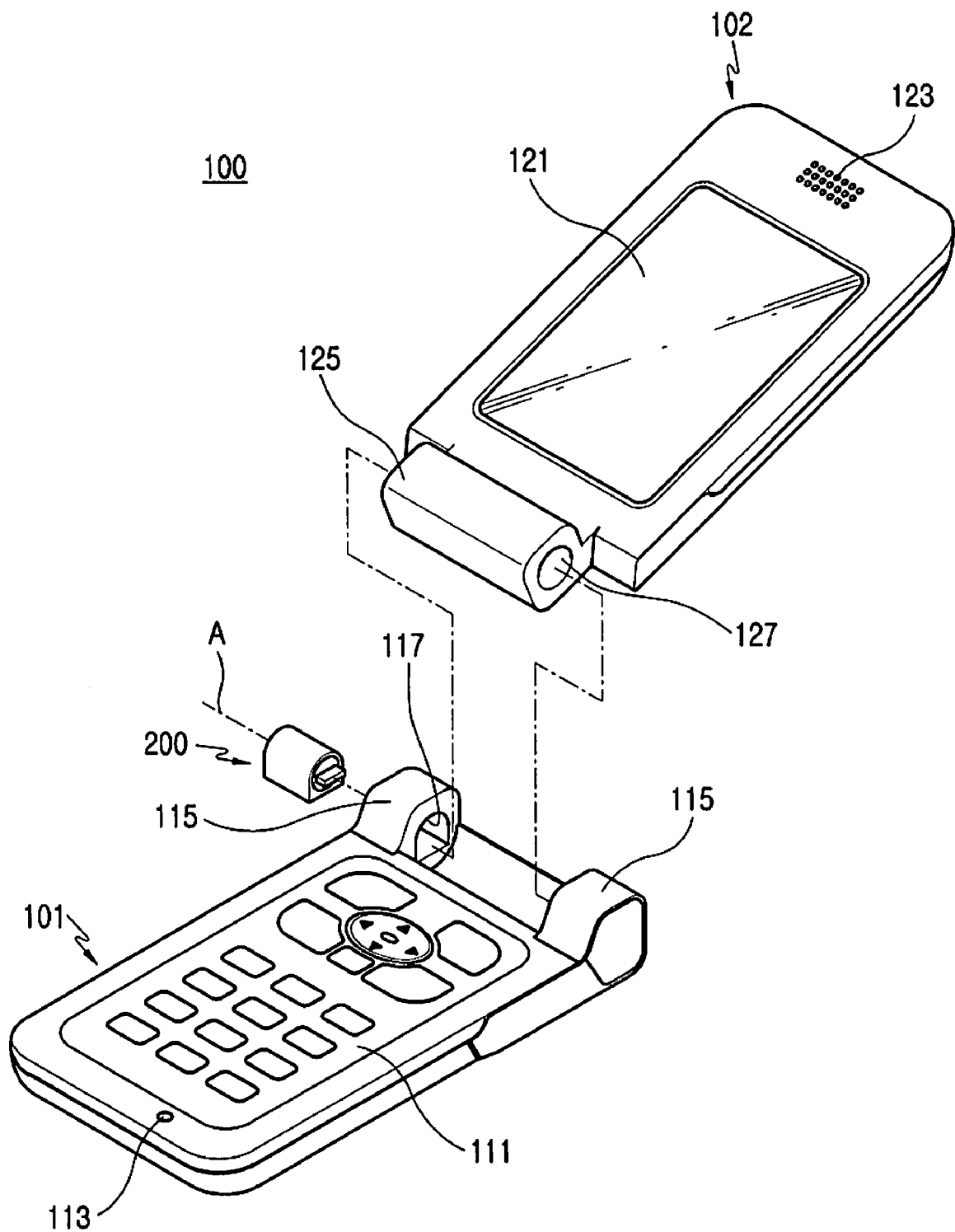
FIG. 1 is an exploded perspective view of a mobile communication terminal provided with a hinge structure according to the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

Referring to FIG. 1, a mobile communication terminal 100 includes a first housing 101, a second housing 102, and a hinge structure 200 for connecting the first and second housings 101 and 102 to enable the second housing 102 to be opened or turned by about 160 degrees from a folded position on the first housing 101 according to the present invention. It will be easily noted by those skilled in this art that the opened angle of the second housing 102 may be set as desired within a range of about 150 to 180 degrees.

The first housing 101 is provided with a keypad 111 and a transmission port 113 for inputting characters, numbers, voices, etc. The terminal 100 is opened or closed by turning the second housing 102. The first housing 101 has an upper end provided with a pair of side hinge arms 115 spaced by a given interval that are used for attaching the second housing 102.

The second housing 102 is provided with a display 121 and a reception port 123, and is rotatably connected to the first housing 101 from an opening or closing position. When the terminal 100 is opened by turning the second housing, a user may operate the terminal 100 in order to search stored or received information, and to transmit and receive information through the display 121 and keypad 111. Of course, the reception port 123 may generate various sounds such as received voice signals and reproduction of music files. The second housing 102 has a lower end provided with a center hinge arm 125 attached between the side hinge arms 115 to be turned relative to them. Both ends of the center hinge arm 125 are provided with a shaft hole 127 shaped to receive a hinge projection 235 shown in FIGS. 2 and 3.

The center hinge arm 125 connected between the side hinge arms 115 forms a hinge axis A for the second housing 102 to be turned relative to the first housing. The hinge structure 200 is mounted in the side hinge arms 115 to provide a drive force for turning the second housing 102.

Figure 2:
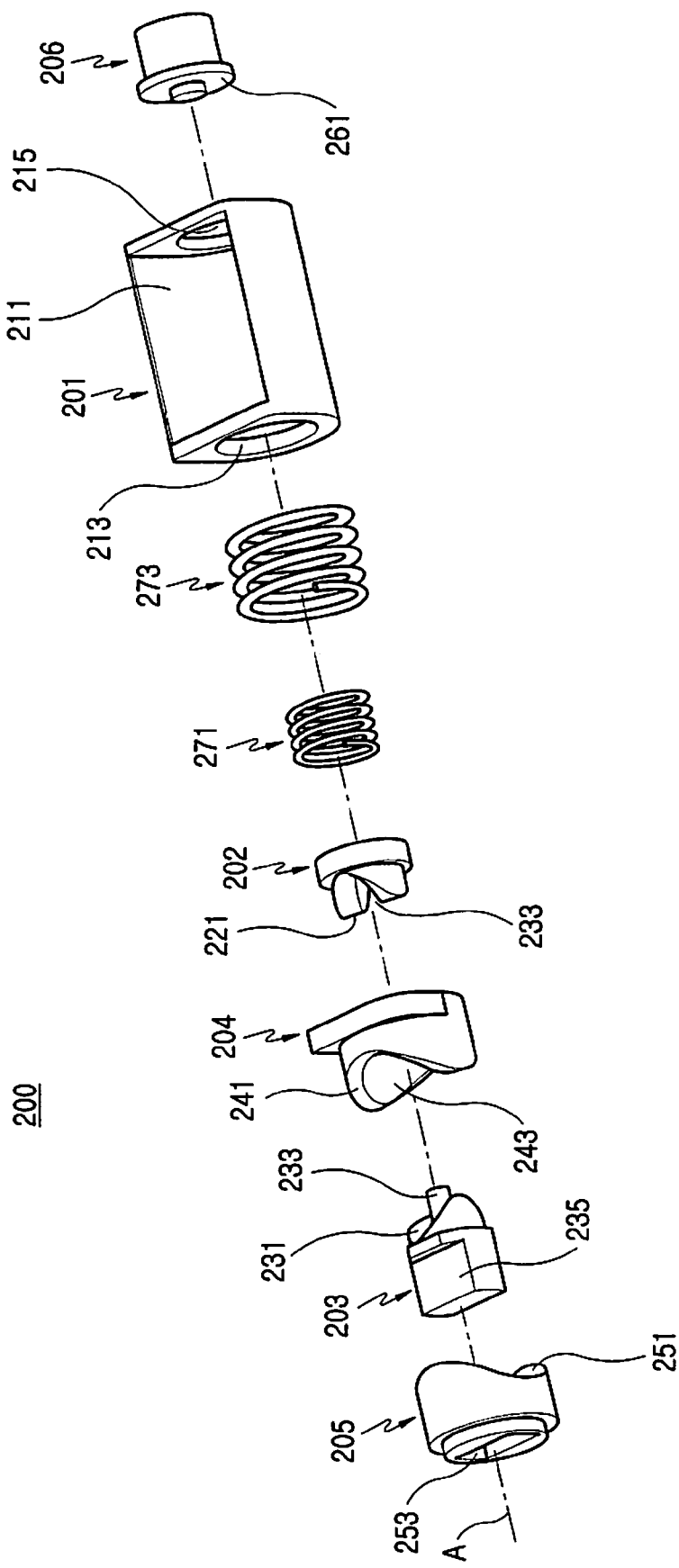
FIG. 2 is an exploded perspective view of the hinge structure of FIG. 1.
Figure 3:
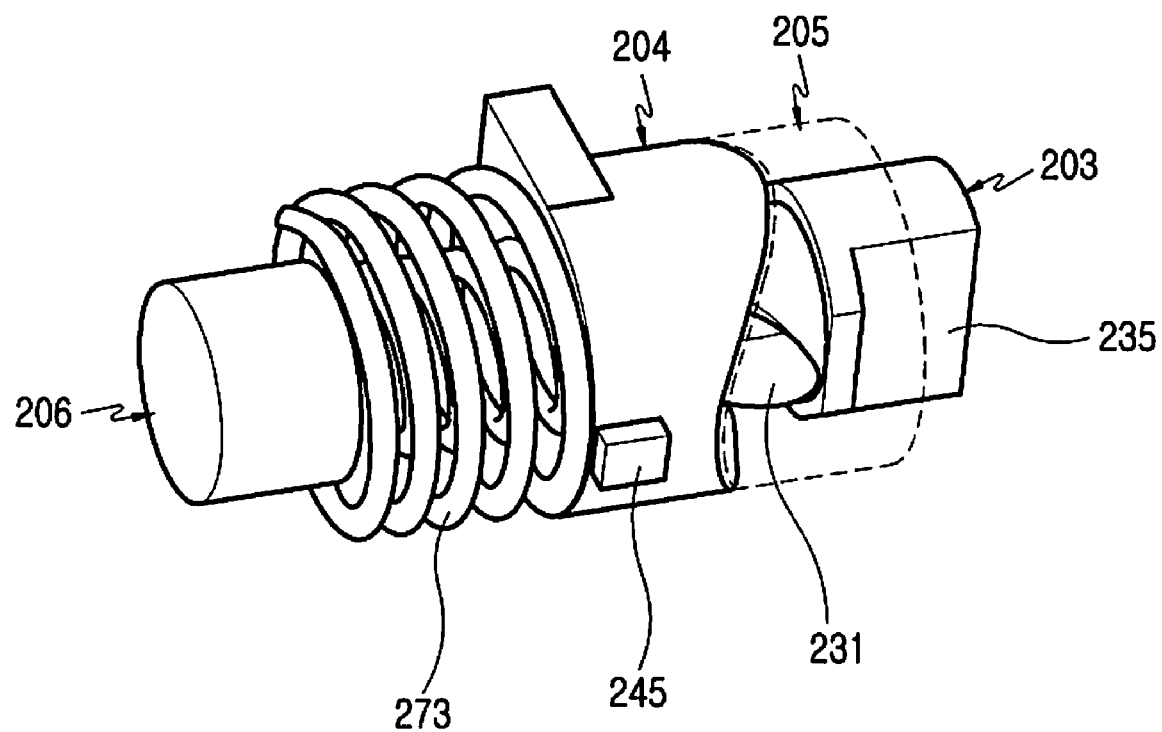
FIG. 3 is an internal perspective view of the hinge structure of FIG. 2 assembled.

Referring to FIGS. 2 and 3, the hinge structure 200 includes a drive cam 202 cooperating with a drive shaft 203 under a resilient force, and a follower shaft 205 cooperating with a follower cam 204 under a resilient force. The drive cam 202 and the drive shaft 203 are respectively arranged in the follower cam 204 and the follower shaft 205. The hinge structure 200 also includes a drive resilient member 271 and an opening/closing resilient member 273 for respectively providing the resilient forces to the drive cam 202 and the follower cam 204, and a hinge housing 201 for enclosing the drive cam 202, drive shaft 203, follower cam 204, follower shaft 205, opening/closing resilient member 273, and drive resilient member 271. In addition, the hinge structure 200 includes a drive button 206 arranged in one end surface of the hinge housing 201 to linearly displace the drive cam 202 to rotate the drive shaft 203.

The hinge structure 200 is mounted in one of the side hinge arms 115 with the hinge projection 235 fixedly connected to the center hinge arm 125 so the center hinge arm 125 may be turned along with the hinge projection relative the side hinge arm 115. The hinge housing 201 may be injection-molded and integrated with the side hinge arm 115. It is desirable for enhancing the productivity of assembling the mobile terminal 100 to separately fabricate the hinge housing 201 to enclose the hinge structure 200 as a single module.

The hinge housing 201 is cylindrically shaped with one side opened, providing an internal mounting space 211 with both ends formed with respective hinge holes 213 and 215. One end part of the drive button 206 is arranged to linearly reciprocate along the hinge axis A through the hinge hole 215 formed in one end of the hinge housing 201. Thus, the hinge structure 200 is mounted in the side hinge arm 115 with the drive button 206 capable of moving inwardly and outwardly from the side of the first housing 101.

The drive cam 202 is arranged in the hinge housing 201 to be linearly displaced along the hinge axis A in the first housing 101, having one end surface formed with a pair of first ridges 221 circumferentially protruding along the hinge axis A. Valleys are formed between the first ridges 221 of the drive cam 202, but their description is omitted for convenience's sake.

The drive shaft 203 is arranged in the hinge housing 201 to be rotated about the hinge axis A in the first housing 101, having one end surface formed with a pair of first valleys 231 circumferentially extending along the hinge axis A. Ridges formed between the first valleys 231, but their description is omitted for convenience's sake.

The drive shaft 203 is arranged to cooperate with the drive cam 202 in sliding contact, so the drive resilient member 271 pushes the apices of the first ridges 221 against the sloping surface of the first valleys 231 to rotate the drive shaft 203. Namely, the drive cam 202 is pushed toward the drive shaft 203 under the resilient force of the drive resilient member 271 in the direction of the first ridges 221 fully engaging the first valleys 231, thus producing a rotational force for rotating the drive shaft 203.

Meanwhile, the hinge projection 235 is provided on the other end surface of the drive shaft 203, extending along the hinge axis A. The hinge projection 235 protrudes through the hinge hole 213 formed in the other end of the hinge housing 201 to be fixedly connected to the center hinge arm 125. Accordingly, the rotation of the drive shaft 203 causes the center hinge arm 125 and thus the second housing to be turned relative to the first housing 101. The hinge projection 235 is only a part of the drive shaft 203 as fixedly connected to the center hinge arm 125, and therefore may have any form to fixedly connect the drive shaft 203 to the center hinge arm 125.

In order to ensure stable rotation of the drive shaft 203 relative to the drive cam 202, a rotational projection 233 formed on the drive shaft 203 is provided along the hinge axis A, which is received by a rotational hole 23 formed in the drive cam 202. Thus, the drive shaft 203 may be stably rotated with the rotational projection 233 being rotatively supported in the rotational hole 223.

The drive resilient member 271 has one end supporting the drive cam 202 and the other end supporting the drive button 206, and applies resilient force both to the drive cam 202 to closely contact the drive shaft 203 and to the drive button 206 to project one end toward the outside of the hinge housing 201. The other end of the drive button 206 is circumferentially provided with a support rib 261 extending laterally from the periphery that is held by the inside of the hinge housing 201. Thus, the drive button 206 is held by the hinge housing 201 under the resilient force of the drive resilient member 271. The drive resilient member 271 may preferably be made of a compression coil spring.

The resilient force of the drive resilient member 271 is converted through the cam surfaces of the first ridges 221 and first valleys 231 into the drive force for rotating the drive shaft 203. Namely, when the first ridges are disengaged from the first valleys 231 to move away the drive cam 202 from the drive shaft 203, the drive resilient member 271 pushes the drive cam 202 toward the drive shaft 203, so the drive shaft 203 may be rotated in the direction of the first valleys 231 engaging the first ridges 221. Namely, the pushing of the drive cam 202 against the drive shaft 203 from the disengaged position causes the first ridges 221 to closely engage the first valleys 231 by tracking the cam surfaces, thus resulting in rotation of the drive shaft 203.

The follower cam 204 is arranged in the hinge housing 201 to surround the drive cam 202. The drive cam 202 and the follower cam 204 are arranged to be linearly displaced along the hinge axis A independently of each other. The follower cam 204 is provided with guide ribs 245 at its periphery, which are engaged by corresponding guide grooves (not shown) formed in the inside of the hinge housing 201 along the hinge axis A, so the follower cam 204 may be linearly guided by the guide ribs and grooves in the hinge housing 201.

In addition, the follower cam 204 has a reception hole 243 cut along the hinge axis A to receive the drive cam 202. Likewise, the drive cam 202 is provided with guide ribs at its periphery, which are engaged by corresponding grooves formed in the internal wall of the reception hole 243, so the drive cam 202 may be linearly guided by the guide ribs and grooves. The follower cam 204 has one end surface formed with a pair of second ridges 241 circumferentially protruding along the hinge axis A. Valleys are formed between the second ridges 241 of the follower cam 204, but their description is omitted for convenience's sake.

The follower shaft 205 is rotatively arranged in the hinge housing 201 to surround the drive shaft 203. The follower shaft 205 also has a through hole 253 extending along the hinge axis A, through which the hinge projection 235 of the drive shaft 203 passes protruding through the hinge hole 213 toward the outside of the hinge housing 201. The hinge projection 235 is fixedly held by the through hole 253 so the follower shaft 205 may be rotated along with the drive shaft 203 in the hinge housing 201. The follower shaft 205 has one end surface formed with a pair of second valleys 251 circumferentially extending along the hinge axis A. Ridges are formed between the second valleys 251, but their description is omitted for convenience's sake.

The follower cam 204 and the follower shaft 205 are arranged to face each other so the sloping surfaces of the second ridges 241 may contact those of the second valleys 251 in sliding manner. The opening/closing resilient member 273 has one end supporting the follower cam 204 and the other end supported by the inside of the hinge housing 201 in order to push the follower cam 204 against the follower shaft 205. The opening/closing resilient member 273 is supported by the inside of the hinge housing 201 to loosely surround the periphery of the other end part of the drive button 206. The opening/closing resilient member 273 may preferably be made of a compression spring.

The rotation of the follower shaft 205 causes the sloping surfaces of the second ridges 241 to be in sliding motion relative to those of the second valleys 251 so the follower cam 204 may be linearly displaced toward or away from the follower shaft 205 under the resilient force of the opening/closing resilient member 273. When external force for rotating the follower shaft 205 is eliminated, the resilient force of the opening/closing resilient member 273 causes the second ridges 241 to engage the second valley 251 to rotate the follower shaft 205. Namely, the resilient force applied to the follower cam 204 is converted by the cooperating cam surfaces of the follower cam 204 and the follower shaft 205 into a rotational force for rotating the follower shaft 205. Since the drive shaft 203 is fixedly connected to the center hinge arm 125 of the second housing 102, the rotational force for rotating the follower shaft 205 causes the drive shaft 203 and thus the second housing 102.

Figure 4:
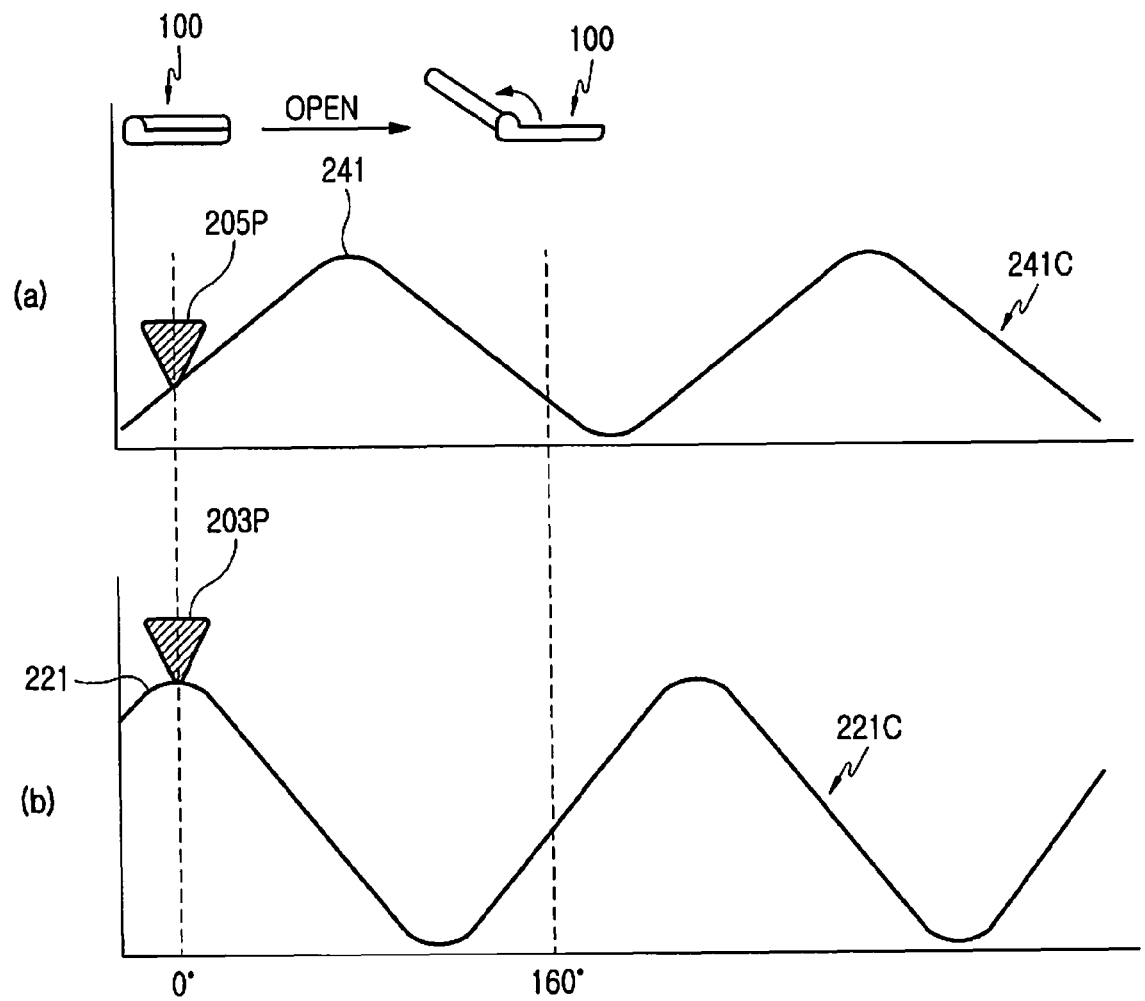
FIG. 4 is a graph for illustrating the tracking of cams arranged in the hinge structure of FIG. 2.

Referring to FIG. 4, opening/closing operations of the mobile terminal provided with the hinge structure 200 are shown. Diagram (a) of FIG. 4 shows the cam track 241c of the follower cam 204, and diagram (b) of FIG. 4 shows the track 221c of the drive cam 202. The reference numerals 205P and 203P represent the points of the follower shaft 205 and the drive shaft 203 respectively contacting the follower cam 204 and the drive cam 202 when the second housing 102 is folded onto the first housing 101. 205P is called a rotation point and 203P is called a drive point.

When the second housing 102 is folded onto the first housing 101, as shown in FIG. 4, the rotation point 205P is placed on a sloping surface of the follower cam 204, and the resilient force of the opening/closing resilient member 273 serves to stably hold the second housing 102 folded onto the first housing 101. Meanwhile, in this state, the drive point 203P is placed on the apex of the first ridge 221 of the drive cam 202 to prevent the drive cam 202 and the drive shaft 203 from operation. Namely, they are maintained in the equilibrium state.

Thereafter, when the user presses the drive button 206 in the state of the second housing 102 folded onto the first housing 101, the pressing force breaks the static position of the drive cam 202 and the drive shaft 203 in cooperation with the resilient force of the drive resilient member 271, thus resulting in forward movement of the drive cam 202. Accordingly, the drive shaft 203 is rotated to move the drive point 203P along a sloping surface of the drive cam 202 to produce a rotational force for turning the second housing 102 from the first housing 101. Subsequently, the mobile terminal 100 begins to open.

Meanwhile, as the follower shaft 205 is rotated along with the drive shaft 203, the rotation point 205P moves along the sloping surface of the second ridge 241 toward its apex, so the follower cam 204 moves away from the follower shaft 205 to compress the opening/closing resilient member 273. Subsequently, when the rotation point 205P passes the apex of the second ridge 241 to reach the next sloping surface, the resilient force of the opening/closing resilient member 273 is converted into a rotational force for fully rotating the second housing 102 away from the first housing 101. Accordingly, the second housing 102 is fully opened from a folded position. It will be readily noted by those skilled in this art that the cam surfaces may be varied to adapt to the operation of rotating the drive shaft 203 by pressing the drive button 206 for opening the second housing 102 from the position folded onto the first housing 101.

Conversely, when a user turns the second housing 102 toward the first housing in order to close the mobile terminal 100, the rotation point 205P moves again along the sloping surface of the second ridge 241 toward its apex. Subsequently, when the rotation point 205P passes the apex of the second ridge 241, the resilient force of the opening/closing resilient member 273 causes the follower cam 204 to be linearly displaced toward and closely engage the follower shaft 205, so the follower shaft 205 is rotated to engage the second valleys 251 with the second ridges 241, thereby rotating the second housing 102 toward the first housing 101. Namely, when the user turns the second housing 102 toward the first housing 101 only by a given interval, the resilient drive force of the hinge structure 200 automatically completes the folding operation of the second housing 102 toward the first housing 101.

As described above, the inventive hinge structure enables the user to automatically open the housings of a mobile terminal simply by pressing a drive button. Furthermore, the hinge structure does not require a motor and necessary conductor lines in order to automatically open/close the mobile terminal, and therefore is advantageous for miniaturization and production cost. In addition, there is no power consumption of the battery for opening/closing the housings of the mobile terminal.

While the invention has been shown and described with reference to a certain preferred embodiment thereof, it will be understood by those skilled in the art that various changes in form and details may be made therein without departing from the spirit and scope of the invention.

What is claimed is:

1. A hinge structure for a mobile communication terminal, the hinge structure comprising:
    a drive cam arranged to be linearly displaced along a hinge axis;
    a drive shaft arranged to face said drive cam to be rotated about the hinge axis according to linear displacement of said drive cam, wherein the drive shaft includes a hinge projection;
    a follower shaft arranged to surround said drive shaft such that the follower shaft rotates with said drive shaft as the follower shaft engages the hinge projection;
    a follower cam arranged to face said follower shaft to be linearly displaced along the hinge axis according to rotation of said follower shaft; and
    an opening/closing resilient member for pushing said follower cam against said follower shaft.

2. The hinge structure according to claim 1, wherein said drive cam is arranged to be linearly moved within said follower cam.

3. The hinge structure according to claim 1, further comprising a drive button arranged to be linearly displaced along said hinge axis, wherein said drive button linearly displaces said drive cam against said drive shaft to rotate said drive.

4. The hinge structure according to claim 1, wherein said drive cam has one side provided with first ridges protruding along said hinge axis, and said drive shaft has one side provided with first valleys circumferentially arranged along said hinge axis, whereby said drive cam is linearly displaced against said drive shaft to rotate said drive shaft in a direction of said first ridges engaging said first valleys.

5. The hinge structure as defined in claim 4, wherein said follower shaft has one side provided with second valleys circumferentially arranged along said hinge axis, and said follower cam has one side provided with second ridges circumferentially protruding along said hinge axis, whereby rotation of said follower shaft causes surfaces of said second valleys to move along surfaces of said second ridges in sliding contact, and said follower cam may be linearly displaced in direction of closely engaging or moving away from said follower shaft under resilient force of said opening/closing resilient member.

6. The hinge structure according to claim 1, wherein said drive cam has one side provided with first ridges protruding along said hinge axis, said drive shaft has one side provided with first valleys circumferentially arranged along said hinge axis, said follower shaft has one side provided with second valleys circumferentially arranged along said hinge axis, and said follower cam has one side provided with second ridges circumferentially protruding along said hinge axis, whereby said drive cam is linearly displaced against said drive shaft to rotate said drive shaft in direction of said first ridges engaging said first valleys, and rotation of said follower shaft along with said drive shaft causes surfaces of said second valleys to move along surfaces of said second ridges in sliding contact, and said follower cam may be linearly displaced in direction of closely engaging or moving away from said follower shaft under resilient force of said opening/closing resilient member.

7. The hinge structure according to claim 6, wherein an angle of the surfaces of said second ridges and second valleys is smoother than that of said first ridges and first valleys.

8. The hinge structure according to claim 1, further comprising:
    a hinge housing; and
    a drive button arranged in said hinge housing to be linearly displaced along said hinge axis, one end part of said drive button protruding from one end surface of said hinge housing,
    wherein said drive cam and follower cam are mounted in said hinge housing to be linearly displaced, and said drive shaft and follower shaft are mounted in said hinge housing to restrain each other, one end part of said drive shaft protruding from another end surface of said hinge housing.

9. The hinge structure according to claim 8, wherein said hinge housing causes said drive cam to be linearly displaced in direction of closely engaging said drive shaft when said drive button is pushed.

10. The hinge structure according to claim 8, further comprising a drive resilient member with one end supporting said drive cam and another end supporting said drive button, wherein said drive resilient member serves to press said drive cam in direction of closely engaging said drive shaft, and to press the drive button to protrude from said one end surface of said hinge housing.

11. The hinge structure according to claim 10, wherein said drive cam has one side provided with first ridges protruding along said hinge axis, said drive shaft has one side provided with first valleys circumferentially arranged along said hinge axis, said follower shaft has one side provided with second valleys circumferentially arranged along said hinge axis, and said follower cam has one side provided with second ridges circumferentially protruding along said hinge axis, whereby said drive cam is linearly displaced against said drive shaft to rotate said drive shaft in direction of said first ridges engaging said first valleys, and rotation of said follower shaft along with said drive shaft causes surfaces of said second valleys to move along surfaces of said second ridges in sliding contact, and said follower cam may be linearly displaced in direction of closely engaging or moving away from said follower shaft under resilient force of said opening/closing resilient member.

12. The hinge structure according to claim 8, wherein said opening/closing resilient member has one end supporting said follower cam and another end supported by an inside of said hinge housing to supply a resilient force to said follower cam.

13. The hinge structure according to claim 8, wherein said opening/closing resilient member is a compression coil spring loosely surrounding a periphery of said drive button and supported by an inside of said hinge housing.

14. The hinge structure according to claim 8, wherein said drive button has another end part provided with a peripheral support rib extended toward an outside thereof, said peripheral support rib being supported by an inside of said hinge housing.

15. The hinge structure according to claim 8, wherein said follower cam is provided with guide ribs protruding from a peripheral surface of said follower cam, and said hinge housing is provided with guide grooves formed inside said hinge housing in direction of said hinge axis, so said guide ribs are respectively engaged by said guide grooves to linearly guide said follower cam.

16. A mobile communication terminal comprising:
  a first housing;
  a second housing; and
  a hinge structure for connecting said first and said second housing to fold or open said second housing onto or from said first housing by turning said second housing about a hinge axis,
  wherein said hinge structure comprises:
  a drive button mounted to be linearly displaced along said hinge axis and to protrude from a peripheral surface of said first housing;
  a drive cam arranged to be linearly displaced along said hinge axis according to the linear displacement of said drive button;
  a drive shaft fixedly mounted in said second housing to face said drive cam to be rotated about said hinge axis according to the linear displacement of said drive cam, wherein the drive shaft includes a hinge projection;
  a follower shaft arranged to surround said drive shaft such that the follower shaft rotates with said drive shaft as the follower shaft engages the hinge projection;
  a follower cam arranged to face said follower shaft to be linearly displaced along the hinge axis according to the rotation of said follower shaft; and
  an opening/closing resilient member for pushing said follower cam against said follower shaft,
  whereby pushing said drive button with said first housing folded onto said second housing linearly displaces said drive cam to make said drive shaft and follower shaft turn said second housing by an angle with reference to said first housing, at which angle said follower cam begins to move forward under the resilient force of said opening/closing resilient member to closely engage said follower shaft, thereby further turning said follower shaft and drive shaft to completely open said second housing.

17. The mobile communication terminal according to claim 16, further comprising a hinge housing, wherein said drive button is arranged in said hinge housing to be linearly displaced along said hinge axis, one end part of said drive button protruding from one end surface of said hinge housing, and said drive cam and follower cam are mounted in said hinge housing to be linearly displaced, and said drive shaft and follower shaft are mounted in said hinge housing to restrain each other, one end part of said drive shaft protruding from another end surface of said hinge housing.

18. The mobile communication terminal according to claim 17, further comprising a drive resilient member with one end supporting said drive cam and another end supporting said drive button, wherein said drive resilient member serves to press said drive cam in direction of closely engaging said drive shaft, and to press the drive button to protrude from said one end surface of said hinge housing.

19. The mobile communication terminal according to claim 18, wherein said opening/closing resilient member is a compression coil spring which linearly displaces said drive cam toward said drive shaft when the opening/closing resilient member is compressed by pushing said drive button into said hinge housing.

20. The mobile communication terminal according to claim 16, wherein said drive cam has one side provided with first ridges protruding along said hinge axis, said drive shaft has one side provided with first valleys circumferentially arranged along said hinge axis, said follower shaft has one side provided with second valleys circumferentially arranged along said hinge axis, and said follower cam has one side provided with second ridges circumferentially protruding along said hinge axis, whereby said drive cam is linearly displaced against said drive shaft to rotate said drive shaft in direction of said first ridges engaging said first valleys, and rotation of said follower shaft along with said drive shaft causes surfaces of said second valleys to move along surfaces of said second ridges in sliding contact, and said follower cam may be linearly displaced in direction of closely engaging or moving away from said follower shaft under resilient force of said opening/closing resilient member.

21. The mobile communication terminal according to claim 16, wherein said hinge structure further includes a through hole formed in said follower shaft along said hinge axis, and said drive shaft has one end part passing said through hole and connected to said second housing.

\* \* \* \* \*